United States Patent
Takahashi et al.

(10) Patent No.: US 12,195,332 B2
(45) Date of Patent: Jan. 14, 2025

(54) METHOD FOR PRODUCING WEAKLY ACIDIC HYPOCHLOROUS ACID AQUEOUS SOLUTION

(71) Applicant: TOKUYAMA DENTAL CORPORATION, Tokyo (JP)

(72) Inventors: Ayumi Takahashi, Tokyo (JP); Eibu Sakata, Tokyo (JP); Kouichirou Hirata, Tokyo (JP); Hideki Kazama, Tokyo (JP)

(73) Assignee: TOKUYAMA DENTAL CORPORATION, Tokyo (JP)

( * ) Notice: Subject to any disclaimer, the term of this patent is extended or adjusted under 35 U.S.C. 154(b) by 890 days.

(21) Appl. No.: 17/057,341

(22) PCT Filed: May 21, 2019

(86) PCT No.: PCT/JP2019/020098
§ 371 (c)(1),
(2) Date: Nov. 20, 2020

(87) PCT Pub. No.: WO2019/225599
PCT Pub. Date: Nov. 28, 2019

(65) Prior Publication Data
US 2021/0188634 A1   Jun. 24, 2021

(30) Foreign Application Priority Data

May 22, 2018 (JP) ................................ 2018-098020
Jan. 25, 2019 (JP) ................................ 2019-011318

(51) Int. Cl.
*C01B 11/04* (2006.01)
(52) U.S. Cl.
CPC .................................. *C01B 11/04* (2013.01)
(58) Field of Classification Search
CPC ....................................................... C01B 11/04
See application file for complete search history.

(56) References Cited

U.S. PATENT DOCUMENTS

2010/0272830 A1   10/2010   Faita

FOREIGN PATENT DOCUMENTS

| JP | 2011509275 A | | 3/2011 |
| JP | 2011111386 A | | 6/2011 |
| JP | 2011173858 A | * | 9/2011 |
| JP | 2013001620 A | * | 1/2013 |
| JP | 2013039553 A | | 2/2013 |
| WO | 2009087188 A2 | | 7/2009 |

OTHER PUBLICATIONS

International Search Report mailed Aug. 20, 2019, in connection with Japanese Patent Application No. PCT/JP2019/020098.
Translation of International Search Report mailed Aug. 20, 2019, in connection with Japanese Patent Application No. PCT/JP2019/020098.
Written Opinion dated Aug. 20, 2019, in connection with Japanese Patent Application No. PCT/JP2019/020098.

* cited by examiner

*Primary Examiner* — Yong L Chu
(74) *Attorney, Agent, or Firm* — Norris McLaughlin, P.A.

(57) ABSTRACT

A method for producing a weakly acidic hypochlorous acid aqueous solution comprises (A) an ion-exchange step for generating molecular hypochlorous acid dissolved in a mixed solution by mixing a raw material aqueous solution composed of an aqueous solution of a metal salt of hypochlorous acid with an acidic ion-exchange resin to perform ion exchange between the metal ions and the hydrogen ions, and (B) a separation step for separating the acidic ion-exchange resin from the mixed solution after the ion-exchange step and obtaining weakly acidic hypochlorous acid aqueous solution in which molecular hypochlorous acid is dissolved.

7 Claims, 2 Drawing Sheets

[FIG. 1]
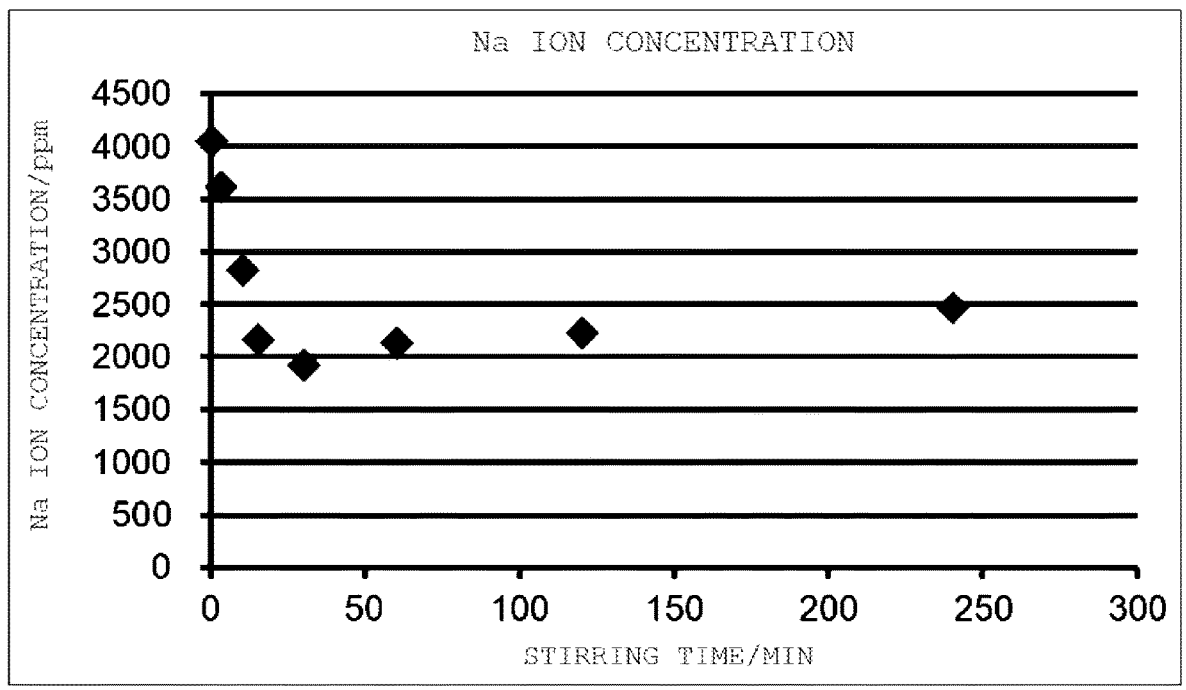
[FIG. 2]
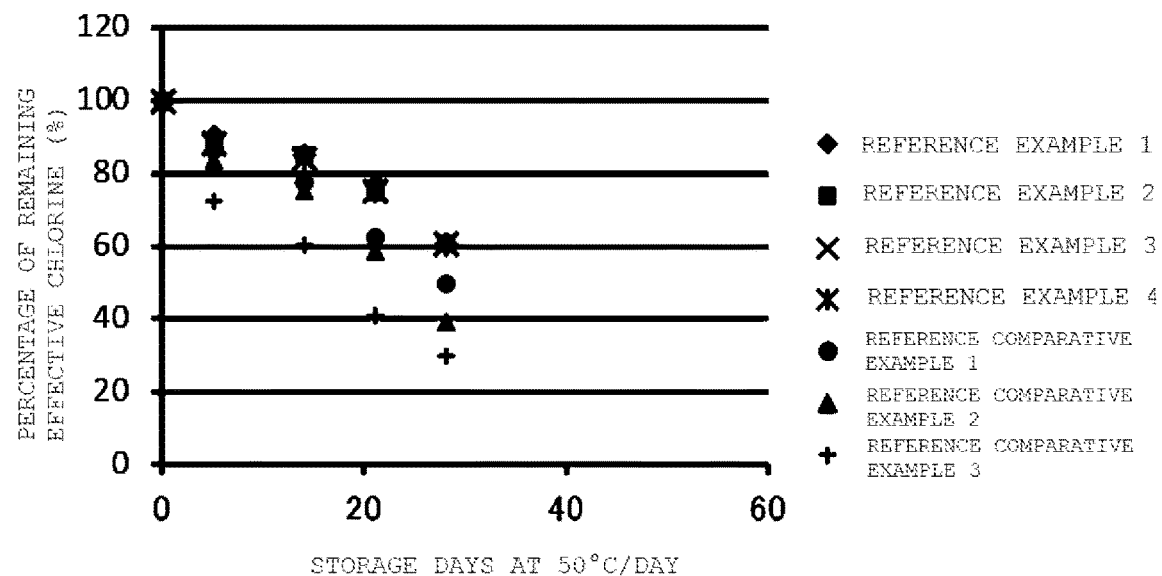

[FIG. 3]
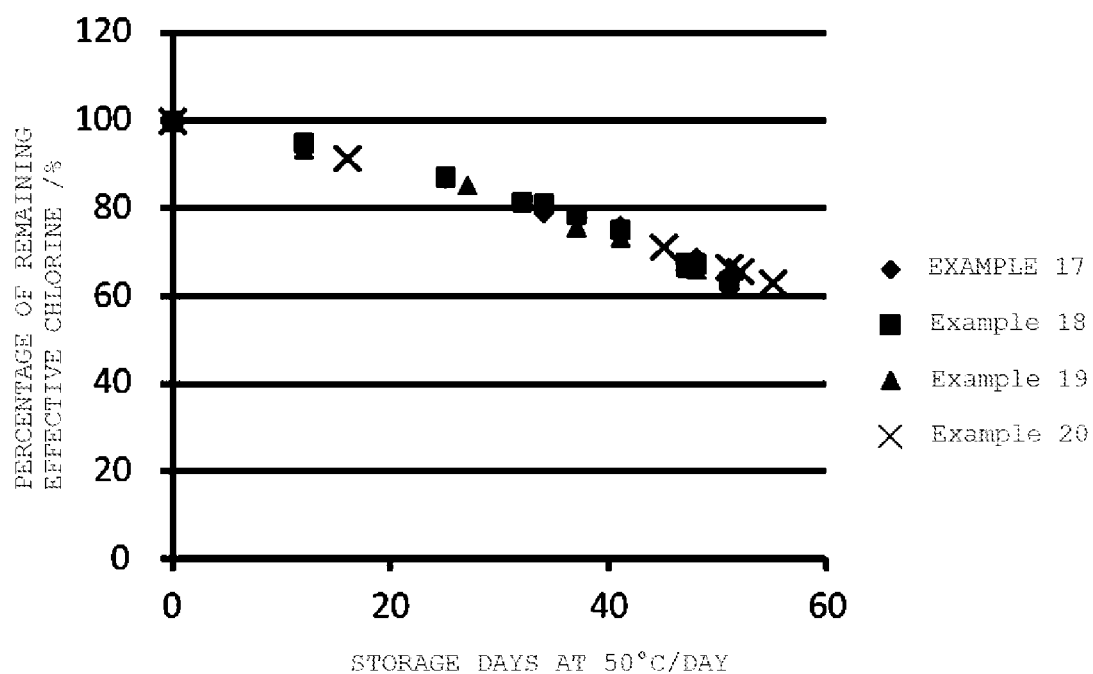

METHOD FOR PRODUCING WEAKLY ACIDIC HYPOCHLOROUS ACID AQUEOUS SOLUTION

This application is a 371 application of PCT/JP2019/020098 filed May 21, 2019, which claims foreign priority benefits under 35 U.S.C. § 119 of Japanese Application Nos. 2018-098020 filed May 22, 2018 and 2019-011318 filed Jan. 25, 2020, the disclosures of each of which are incorporated by reference herein in their entirety.

TECHNICAL FIELD

The present invention relates to a method for producing a weakly acidic hypochlorous acid aqueous solution.

BACKGROUND ART

An existing form of hypochlorous acid in an aqueous solution changes depending on the pH. Specifically, in a weakly acidic region with a pH of about 3 to 6, most of hypochlorous acid exists as molecular hypochlorous acid (HClO), and in a basic region with a pH of 9 or higher, an existence as dissociated hypochlorite ion (OCl$^-$) becomes predominant. In a strongly acidic region (for example, pH is less than 3), generation of chlorine molecules (Cl$_2$) becomes predominant as the pH decreases. Among these existing forms, molecular hypochlorous acid (HClO) has an extremely high bactericidal effect, and it is said that the bactericidal effect is about 80 times that of ionic hypochlorous acid (OCl$^-$). A weakly acidic hypochlorous acid aqueous solution with a pH of 3 to 6 containing a large amount of molecular hypochlorous acid having such a high bactericidal effect has relatively high safety to the human body, so that the weakly acidic hypochlorous acid aqueous solution is used as a disinfectant or sterilizer in various fields such as medical, dental, agricultural, and food processing. In recent years, the weakly acidic hypochlorous acid aqueous solution has come to be used for public facilities such as nursing care facilities, educational facilities, and commercial facilities, and for disinfection and sterilization in general households, and its consumption is increasing year by year.

As a method for producing such a weakly acidic hypochlorous acid aqueous solution, there have been known an electrolysis method for electrolyzing an aqueous sodium chloride solution (see Patent Literature 1), a hydrochloric acid method for adding hydrochloric acid to a basic aqueous hypochlorite solution (see Patent Literature 2), and a method (hereinafter, also simply referred to as "ion exchange method". See Patent Literature 3) of treating a raw material aqueous solution containing an aqueous hypochlorite solution with an acidic ion exchange resin.

Among these methods, the ion exchange method does not require a special device such as an electrolyzer and does not generate dangerous chlorine gas, so that the ion exchange method is an excellent method as a method for producing a weakly acidic hypochlorous acid aqueous solution easily and safely.

CITATION LIST

Patent Literature

Patent Literature 1: JP 2011-111386 A
Patent Literature 2: JP 2013-39553 A
Patent Literature 3: JP 2011-509275 A

SUMMARY OF INVENTION

Technical Problem

In the technique described in Patent Literature 3, an aqueous sodium hypochlorite solution and an acidic ion exchange resin having a carboxyl group as an ion exchange group are mixed and stirred, and then allowed to stand to settle the acidic ion exchange resin. Then, a weakly acidic hypochlorous acid aqueous solution obtained as a supernatant is used for biocide treatment for agricultural use. This method has an advantage that a weakly acidic hypochlorous acid aqueous solution can be easily obtained at an application site.

However, in order to avoid a decrease in effectiveness due to decomposition of hypochlorous acid, the obtained weakly acidic hypochlorous acid aqueous solution needs to be used in a short time after production, and there are restrictions on its use conditions.

Thus, an object of the present invention is to provide a method capable of efficiently producing a weakly acidic hypochlorous acid aqueous solution having improved storage stability when the weakly acidic hypochlorous acid aqueous solution is produced by an ion exchange method (a method for mixing and stirring an aqueous hypochlorite solution and an acidic ion exchange resin and then separating the acidic ion exchange resin to obtain a weakly acidic hypochlorous acid aqueous solution is hereinafter also referred to as the "batch method") similar to the method described in Patent Literature 3.

Solution to Problem

In general, it is known that even in a weakly acidic region with a pH of about 3 to 6, molecular hypochlorous acid in an aqueous solution disappears due to autolysis (2HClO→2HCl+O$_2$ and/or 3HClO→2HCl+HClO$_3$) and rapid reduction decomposition [HClO→HCl+(O)] when the molecular hypochlorous acid comes into contact with an organic substance. In treatment in the batch method using an acidic ion exchange resin, ion exchange of Na$^+$→H$^+$ cannot be completed in relation to a decrease in pH of a treatment liquid as the treatment progresses.

In addition, ionic and/or molecular hypochlorous acid comes into contact with a resin portion of the ion exchange resin to be reduced and decomposed, and metal ions (derived from hypochlorite) are likely to remain in a solution. It is considered that hypochlorous acid is decomposed by the remaining metal ions. In fact, according to the study by the present inventors, although the reduction decomposition reaction does not seem to occur in a glass container, it is confirmed that the reduction decomposition occurs also when a weakly acidic hypochlorous acid aqueous solution obtained by the batch method is separated from an acidic ion exchange resin and then stored in a glass container.

Based on this recognition, the present inventors have considered that if it is possible to reduce an amount of hypochlorous acid that is reduced and decomposed by contact with the resin portion of the ion exchange resin and, at the same time, to reduce a residual metal ion concentration, the intended object can be attained, and the present inventors have conducted a diligent study.

As a result, the present inventors have found that (1) when the weakly acidic hypochlorous acid aqueous solution separated from the acidic ion exchange resin is stored in a glass container, a time course of the concentration (corresponding to an effective chlorine concentration in the weakly acidic region) of the molecular hypochlorous acid depends on a ratio of the remaining metal ions to the effective chlorine concentration, and when the ratio exceeds a certain threshold value, a decrease rate of the concentration (effective chlorine concentration) of hypochlorous acid increases sharply (see Table 3 and FIG. 2 below), and (2) although the concentration of the metal ion during the contact treatment with the acidic ion exchange resin in the batch method sharply decreases after the start of contact, if the contact time is lengthened, the concentration starts to increase and then continues to increase gradually (see FIG. 1 below), thus completing the present invention.

That is, the present invention is a method for producing a target aqueous solution including (A) an ion exchange step of mixing a raw material aqueous solution containing an aqueous solution of metal salt of hypochlorous acid with an acidic ion exchange resin and performing ion exchange between a metal ion and a hydrogen ion to produce molecular hypochlorous acid dissolved in a mixed solution, and (B) a separation step of separating the acidic ion exchange resin from the mixed solution after the ion exchange step to obtain the target aqueous solution containing an aqueous solution in which the molecular hypochlorous acid is dissolved.

In the method for producing a weakly acidic hypochlorous acid aqueous solution, in the (A) ion exchange step, a quantity ratio of the raw material aqueous solution and the acidic ion exchange resin mixed is a quantity ratio at which a ratio ($E_{MI}/E_{IE}$) of a total ion exchange equivalent ($E_{IE}$) of the acidic ion exchange resin and a total chemical equivalent ($E_{MI}$) of the metal ion in the raw material aqueous solution is 0.05 or more and 0.5 or less, a solution temperature during mixing is 5° C. or more and 40° C. or less, and a mixing time is 10 minutes or more and 120 minutes or less.

After the (B) separation step, a target aqueous solution which has a pH of 3.0 or more and 5.5 or less and in which a ratio ($C_{MI}/C_{EC}$) of a total concentration ($C_{MI}$) of a metal ion to an effective chlorine concentration ($C_{EC}$) is 0.35 or less is obtained.

Advantageous Effects of Invention

According to the production method of the present invention, when a weakly acidic hypochlorous acid aqueous solution is produced by an ion exchange method adopting the batch method, it is possible to efficiently produce a weakly acidic hypochlorous acid aqueous solution excellent in storage stability while suppressing loss of molecular hypochlorous acid during production.

Although a mechanism by which such an excellent effect is obtained is not clear, the present inventors presume as follows. That is, by setting the quantity ratio of the raw material aqueous solution and the acidic ion exchange resin in the (A) ion exchange step within a predetermined range, the amount of reduction decomposition at an initial stage of contact is prevented from becoming too large at a solution temperature that is easy to operate and control, and it is estimated that maximum ion exchange (Na+→H+) at a desired pH can be completed within the contact time that does not increase so much after the metal ion concentration becomes the lowest.

BRIEF DESCRIPTION OF DRAWINGS

FIG. 1 is a graph showing a time course of a Na ion concentration during an ion exchange step in Comparative Example 2.

FIG. 2 is a graph showing a time course of an effective chlorine concentration in Reference Examples 1 to 4 and Reference Comparative Examples 1 to 3.

FIG. 3 is a graph showing a time course of the effective chlorine concentration in Examples 17 to 20.

DESCRIPTION OF EMBODIMENTS

The above-mentioned operations and advantages of the present invention will be described in detail below.

The production method of the present invention includes (A) an ion exchange step of mixing a raw material aqueous solution containing an aqueous solution of metal salt of hypochlorous acid with an acidic ion exchange resin and performing ion exchange between a metal ion and a hydrogen ion to produce molecular hypochlorous acid dissolved in a mixed solution, and (B) a separation step of separating the acidic ion exchange resin from the mixed solution after the ion exchange step to obtain a target aqueous solution containing an aqueous solution in which the molecular hypochlorous acid is dissolved.

In this production method, in the (A) ion exchange step, a quantity ratio of the raw material aqueous solution and the acidic ion exchange resin mixed is a quantity ratio at which a ratio ($E_{MI}/E_{IE}$) of a total ion exchange equivalent ($E_{IE}$) of the acidic ion exchange resin and a total chemical equivalent ($E_{MI}$) of the metal ion in the raw material aqueous solution is 0.05 or more and 0.5 or less, a solution temperature during mixing is 5° C. or more and 40° C. or less, and a mixing time is 10 minutes or more and 120 minutes or less.

After the (B) separation step, a target aqueous solution which has a pH of 3.0 or more and 5.5 or less and in which a ratio ($C_{MI}/C_{EC}$) of a total concentration ($C_{MI}$) of a metal ion to an effective chlorine concentration ($C_{EC}$) is 0.35 or less is obtained.

[Target Aqueous Solution]

The target aqueous solution obtained by the production method of the present invention is a weakly acidic hypochlorous acid aqueous solution which has a pH of 3.0 or more and 5.5 or less and in which the ratio ($C_{MI}/C_{EC}$) of the total concentration ($C_{MI}$) of metal ions to the effective chlorine concentration ($C_{EC}$) is 0.35 or less.

It is known that the autolysis rate of molecular hypochlorous acid in an aqueous solution changes depending on the pH, and it is known that the autolysis rate becomes the fastest at a pH of about 6.7, the rate decreases as the pH decreases, and the rate hardly changes when the pH is 5.5 or less. Therefore, when the pH is set to 5.5 or less, a stable weakly acidic hypochlorous acid water can be obtained. On the other hand, when the pH is less than 3.0, a part of the molecular hypochlorous acid becomes chlorine and volatilizes as chlorine gas. Thus, in addition to storage stability, from the viewpoint of safety, the pH must be 3.0 or more. The pH of the weakly acidic hypochlorous acid aqueous solution is not particularly limited as long as the pH is 3.0 or more and 5.5 or less, and the pH is more preferably 4.0 or more and 5.5 or less from the viewpoint that an existence probability of molecular hypochlorous acid (HClO) having a high bactericidal effect is higher and the bactericidal effect is enhanced.

As described above, since the decomposition of molecular hypochlorous acid is promoted by the existence of metal ions, ideally, the concentration of metal ions in the weakly acidic hypochlorous acid aqueous solution is preferably zero. However, an ion exchange power of the acidic ion exchange resin becomes low especially in a low pH range. Since the acidic ion exchange resin is not suitable for ion exchange of a neutral salt such as salt produced by decomposition of hypochlorous acid, metal ions cannot be completely removed by the ion exchange method. Therefore, in order to obtain good storage stability, it is necessary to reduce metal ions as much as possible. According to the study by the present inventors, regarding the decomposition of molecular hypochlorous acid by metal ions, it has been clarified that the ratio ($C_{MI}/C_{EC}$) of the total concentration ($C_{MI}$) of metal ions to the effective chlorine concentration ($C_{EC}$) increases significantly when the ratio exceeds a specific threshold value. The threshold value of the weakly acidic hypochlorous acid aqueous solution at a solution temperature of 5° C. or more and 40° C. or less is around over 0.35. Thus, the ratio ($C_{MI}/C_{EC}$) in the weakly acidic hypochlorous acid aqueous solution needs to be 0.35 or less. The lower the ratio ($C_{MI}/C_{EC}$), the better; however, as described above, in the batch method, it is substantially impossible to set the total concentration ($C_{MI}$) of metal ions to zero. The ratio is preferably 0.30 or less and 0.05 or more, and particularly preferably 0.25 or less and 0.10 or more, because the stabilizing effect can be obtained more reliably.

The effective chlorine concentration ($C_{EC}$) means a total chlorine equivalent concentration of chlorine molecules dissolved in an aqueous solution, a chlorine compound (for example, molecular hypochlorous acid) having oxidizing power, and a chlorine atom-containing ion (for example, ionic hypochlorous acid) having oxidizing power. More specifically, the effective chlorine concentration ($C_{EC}$) means a concentration obtained by converting the mass-based concentration of each component into a mass-based chlorine concentration and then summing the concentrations. Accordingly, when the hypochlorite metal salt is sodium hypochlorite (NaClO: molecular weight 74.44), the molecular weight of chlorine is 70.90. Therefore, when the effective chlorine concentration of the aqueous solution is $C_{EC}$ (mass ppm), a NaClO concentration: $C_{NaClO}$ (mass ppm) of the aqueous solution can be calculated based on the following formula.

$$C_{NaClO}(\text{mass ppm}) = C_{EC}(\text{mass ppm}) \times (74.44/70.90)$$

When a specific gravity of the aqueous sodium hypochlorite solution is represented by SG, the NaClO concentration in the aqueous solution: $C_{NaClO}$ (mol/L, L represents liter) can be calculated by the following formula.

$$C_{NaClO}(\text{mol/L}) = [1000 \times SG \times C_{NaClO}(\text{mass ppm}) \times 10^{-6}]/74.44 = [SG \times C_{EC}(\text{mass ppm}) \times 10^{-3}]/70.90$$

In the present invention, as the effective chlorine concentration, a concentration measured by absorptiometry with an iodine reagent is adopted. For example, the concentration can be measured using an effective chlorine concentration measurement kit AQ-202 (Sibata Scientific Technology Ltd.). In a weakly acidic aqueous metal hypochlorite solution having a pH of 3.0 or more and 5.5 or less, almost all amount of the hypochlorous acid exists in the molecular form, so that the effective chlorine concentration substantially means the effective chlorine concentration derived from molecular hypochlorous acid.

The total concentration ($C_{MI}$) of metal ions means a total concentration of an amount of metal ions derived from an aqueous solution of a metal salt of hypochlorous acid as a raw material, which is measured by an ion electrode method.

[(A) Ion Exchange Step]

In the (A) ion exchange step, the raw material aqueous solution and the acidic ion exchange resin are mixed, and ion exchange is performed between metal ions and hydrogen ions, so that molecular hypochlorous acid is produced in a state of being dissolved in the mixed solution. The mixing means a state in which the raw material aqueous solution being treated is mixed with the acidic ion exchange resin so as to always have a uniform composition and pH. A state in which the composition and pH of the raw material aqueous solution being treated differ locally, for example, a state in which the two are substantially separated into two layers is not regarded as a mixed state. In order to obtain a uniform mixed state, it is preferable to stir the mixed solution.

The aqueous solution of the metal salt of hypochlorous acid used as the raw material aqueous solution in the (A) ion exchange step means an aqueous solution in which metal hypochlorite such as sodium hypochlorite (NaClO), potassium hypochlorite (KClO), calcium hypochlorite (Ca(ClO)$_2$), or barium hypochlorite (Ba(ClO)$_2$) is dissolved.

The method for producing an aqueous solution of the metal hypochlorite is not particularly limited, and the aqueous solution can be produced by a known method. For example, an aqueous sodium hypochlorite solution can be produced by electrolyzing NaOH and Cl$_2$. Moreover, hypochlorite sold as a reagent or the like may be dissolved in water to form an aqueous solution, or an aqueous hypochlorite solution sold as a reagent or the like may be used as it is or may be used by being diluted with water. Although tap water, distilled water, and ion-exchanged water can be used as solvent water and diluted water without any particular limitation, water having an ion conductivity of 3 (mS/m) or less is preferably used from the viewpoint of storage stability of a weakly acidic hypochlorous acid aqueous solution to be obtained.

The concentration of an aqueous metal hypochlorite solution, which is the raw material aqueous solution, is not particularly limited and is usually in a range of 50 (ppm) to 50,000 (ppm) in terms of effective chlorine concentration. When the effective chlorine concentration in the raw material aqueous solution is as low as less than 50 (ppm), the yield of molecular hypochlorous acid (corresponding to a molar equivalent of molecular hypochlorous acid remaining in a solution/a molar equivalent of metal hypochlorite in the raw material aqueous solution) tends to decrease due to an influence of a certain amount of decomposition that inevitably occurs. When the effective chlorine concentration is very high of 100,000 (ppm), a frequency of contact with the ion exchange resin during stirring increases, and a large amount of the produced molecular hypochlorous acid decomposes, so that the yield tends to decrease. Thus, from the viewpoint of efficient production, the effective chlorine concentration of the raw material aqueous solution is preferably 500 (ppm) to 50,000 (ppm) and more preferably 1,000 (ppm) to 50,000 (ppm), and, in consideration of ease of handling and the like, the effective chlorine concentration is most preferably 5,000 (ppm) to 30,000 (ppm).

As the acidic ion exchange resin used in the (A) ion exchange step, a weakly acidic ion exchange resin having a carboxyl group (—COOH) as an ion exchange group is preferably used. Such a weakly acidic ion exchange resin usually has a structure in which acrylic acid, methacrylic acid, maleic acid or the like is polymerized and a carboxyl group is introduced into the resin three-dimensionally cross-linked with divinylbenzene. The weakly acidic ion exchange resin having such a structure has a buffering action, and even when a large amount of the weakly acidic ion exchange resin is used, the pH of a treated aqueous solution is not reduced to a value lower than about 5. Therefore, there is no danger of generating chlorine gas during treatment. In addition, the weakly acidic ion exchange resin has a characteristic that the weakly acidic ion exchange resin can be easily regenerated by being treated with a chemical such as hydrochloric acid or sulfuric acid aqueous solution after use (the ion exchange group can be returned to the form of —COOH). The acidic ion exchange resin is preferably a weakly acidic ion exchange resin.

In the present invention, in the (A) ion exchange step, it is necessary to set the quantity ratio of the raw material aqueous solution and the acidic ion exchange resin within a predetermined range. The predetermined range is the quantity ratio at which the ratio ($E_{MI}/E_{IE}$) of the total ion exchange equivalent ($E_{IE}$) of the acidic ion exchange resin and the total chemical equivalent ($E_{MI}$) of metal ions in the raw material aqueous solution is 0.05 or more and 0.5 or less. By bringing the raw material aqueous solution into contact with the acidic ion exchange resin at such a quantity ratio, a weakly acidic hypochlorous acid water having good storage stability can be produced.

The total ion exchange equivalent ($E_{IE}$) of the acidic ion exchange resin means an ion exchange capacity when all the exchange groups of the ion exchange resin act, and the units are equivalents (eq). For example, when 100 ml of acidic ion exchange resin having a total ion exchange capacity of 3.9 (eq/L-resin) is used, the total ion exchange equivalent of the ion exchange resin is $E_{IE}$=0.39 (eq). The total chemical equivalent ($E_{MI}$) of metal ions in the raw material aqueous solution means the sum of the valences of metal ions contained in the aqueous solution of the metal salt of hypochlorous acid, which is the raw material, and the units are indicated by equivalents (eq). For example, when the metal salt of hypochlorous acid, which is the raw material, is NaClO, the effective chlorine concentration is 2000 (ppm), and the capacity is 1 (L), the total chemical equivalent of metal ions in the raw material aqueous solution is $E_{MI}$=0.028 (eq).

When the quantity ratio ($E_{MI}/E_{IE}$) of the raw material aqueous solution and the acidic ion exchange resin to be mixed exceeds 0.5, metal ions, which are one of the factors that reduce the storage stability, cannot be sufficiently adsorbed. In this case, that is, when the amount of ion exchange resin is less than a required amount, the pH gradually decreases as the ion exchange reaction progresses, and when Na adsorption and desorption reach equilibrium, the $C_{MI}/C_{EC}$ value exceeds 0.35, so that a target weakly acidic hypochlorous acid aqueous solution cannot be obtained. The ($E_{MI}/E_{IE}$) is preferably 0.48 or less and particularly preferably 0.45 or less, because the amount of Na adsorbed is increased, the $C_{MI}/C_{EC}$ value is lowered, and high-purity weakly acidic hypochlorous acid water is produced.

On the other hand, if the quantity ratio ($E_{MI}/E_{IE}$) of the raw material aqueous solution and the acidic ion exchange resin to be mixed is less than 0.05, the effective chlorine concentration becomes extremely low (for example, about 10 ppm) during treatment, and the target aqueous solution cannot be obtained. According to the study by the present inventors, it is considered that a surface of the ion exchange resin includes an active site (hereinafter, also referred to as the "specific high active site") having a unique property of having a very high activity against decomposition of ionic and/or molecular hypochlorous acid and being easily deactivated by oxidation. Although this specific high active site is rapidly deactivated by contact with ionic and/or molecular hypochlorous acid, when the ratio ($E_{MI}/E_{IE}$) is less than 0.05, decomposition reaction of the ionic and/or molecular hypochlorous acid occurs at once before such deactivation occurs, and therefore, it is considered that the effective chlorine concentration is significantly lowered. On the other hand, when the ratio is 0.05 or more, the specific high active site is deactivated and disappears in a state in which sufficient molecular hypochlorous acid remains, so that it is considered that the target aqueous solution can be obtained. Although there are active sites that cause a decomposition reaction in addition to the specific high active sites, the decomposition activity is low. Therefore, it is considered that at the solution temperature and mixing time (treatment time) specified in the present invention, decomposition of molecular hypochlorous acid is limited, and the target aqueous solution can be obtained. From the viewpoint of reducing the amount of the acidic ion exchange resin used and reducing the production cost, ($E_{MI}/E_{IE}$) is preferably 0.15 or more, and particularly preferably 0.2 or more.

The solution temperature in the (A) ion exchange step, that is, the reaction temperature during the ion exchange reaction is 5° C. or more and 40° C. or less, and preferably 10° C. or more and 35° C. or less. If the solution temperature is within such a range, it is easy to handle, and the cost required for temperature control can be kept low. In addition, it is easy to reduce metal ions in the weakly acidic hypochlorous acid aqueous solution to be produced and suppress the decomposition of molecular hypochlorous acid. If the solution temperature is less than 5° C., the speed of the ion exchange reaction slows down, and the mixing time required for sufficient ion exchange exceeds 120 minutes, so that it becomes difficult to reduce the amount of metal ions below the threshold value. On the other hand, when the temperature exceeds 40° C., the decomposition of the aqueous solution of the metal salt of hypochlorous acid, which is the raw material, and the produced molecular hypochlorous acid is promoted, and volatilization of molecular hypochlorous acid is also promoted, so that the effective chlorine concentration of the aqueous solution is significantly reduced.

The mixing time in the (A) ion exchange step is 10 minutes or more and 120 minutes or less, preferably 10 minutes or more and 90 minutes or less, and more preferably 15 minutes or more and 60 minutes or less. If the mixing time is less than 10 minutes, the ion exchange reaction is insufficient, a large amount of metal ions remains, and the storage stability of the weakly acidic hypochlorous acid water is reduced. On the other hand, if the mixing time exceeds 120 minutes, the contact with the ion exchange resin takes a long time, so that the produced molecular hypochlorous acid is gradually decomposed. Since HCl (strong acid) generated by decomposition has the effect of desorbing metal ions adsorbed on the ion exchange resin, the amount of metal ions in the solution increases, and the storage stability is reduced after all.

[Pretreatment Step]

Prior to the (A) ion exchange step, it is preferable to further provide a pretreatment step including an oxidation treatment step in which the acidic ion exchange resin and the oxidizing agent aqueous solution are brought into contact with each other, that is, an oxidation treatment step in which the contact is performed until the oxidizing substance having an amount of 0.3 mol equivalent or more and 1.0 mol equivalent or less per liter of the acidic ion exchange resin is reduced.

That is, loss of effective chlorine can be reduced by previously treating the specific high active site existing on a surface of the acidic ion exchange resin with an oxidizing agent. This pretreatment step is an arbitrary step and is not an essential step in the present invention.

In the above method, the oxidizing substance is preferably at least one compound selected from the group consisting of molecular hypochlorous acid, chlorine dioxide, hydrogen peroxide, ozone, and organic peroxide. In addition, the pretreatment step preferably further includes a washing step of washing the acidic ion exchange resin, oxidized in the oxidation treatment step, with ion-exchanged water or pure water.

When a substance other than molecular hypochlorous acid is used as the oxidizing agent in the pretreatment step in the production method of the present invention, in order to avoid mixing of the oxidizing agent into a product, it is preferable to perform the oxidation treatment step and then perform washing with water (washing step) following the oxidation treatment step. Hereinafter, these steps will be described.

In the oxidation treatment step, the acidic ion exchange resin and the oxidizing agent aqueous solution in which the oxidizing substance is dissolved are brought into contact with each other. Although it is considered that this is because the specific high active site of the acidic ion exchange resin is oxidized and disappears due to the contact, the decomposition of the molecular hypochlorous acid generated in the ion exchange step is suppressed, and the effective chlorine loss can be reduced.

The oxidizing agent aqueous solution used in the oxidation treatment step consists of an aqueous solution in which an oxidizing substance is dissolved. When the oxidizing agent aqueous solution contains a large amount of metal ions, the metal ions exchange ions with $H^+$ in the ion exchange group of the acidic ion exchange resin, so that the ion exchange capacity in the ion exchange step is lowered. Therefore, the lower the metal ion concentration in the oxidizing agent aqueous solution is, the more preferable it is, and it is most preferable that no metal ion be contained. However, depending on the oxidizing substance (oxidizing agent) used, even when an oxidizing agent other than a metal salt or a metal compound is used, if the oxidizing agent is an aqueous solution, the metal ions may be contained in the aqueous solution. In such a case, in order to achieve a more efficient production method in which the ion exchange capacity is not lowered in the pretreatment step, a total valence equivalent (eq) of the metal ion is $\frac{1}{5}$ or less, preferably $\frac{1}{10}$ or less, and more preferably $\frac{1}{15}$ or less with respect to a total ion exchange equivalent (eq) of the ion exchange resin.

The oxidizing substance (oxidizing agent) dissolved in the oxidizing agent aqueous solution is a substance having water solubility and functioning as an oxidizing agent, and a compound containing no metal is used as a constituent element. Examples of oxidizing substances that can be preferably used include molecular hypochlorous acid, chlorine dioxide, hydrogen peroxide, ozone, and organic peroxides such as methyl ethyl ketone peroxide and benzoyl peroxide. Among these, preferred is an oxidizing agent composed of an inorganic compound that does not affect physical properties and stability even if the oxidizing agent cannot be completely washed and remains in the washing step, and most preferred is hypochlorous acid composed of the same component as the target aqueous solution.

Although the amount of the oxidizing substance (oxidizing agent) used in the oxidation treatment step may be 0.3 mol equivalent or more per liter of the acidic ion exchange resin, and in order to carry out sufficient treatment, the amount is particularly preferably 0.35 mol equivalent or more, and most preferably 0.4 mol equivalent or more. Although the upper limit value is not particularly limited as long as the contact conditions can be controlled, from the viewpoint of preventing overuse, the upper limit is preferably 2.0 mol equivalent or less, and particularly preferably 1.5 mol equivalent or less based on the same standard.

Here, the mol equivalent is a value obtained by multiplying the number of moles of atoms whose oxidation number changes in an oxidizing substance by an amount of change in the oxidation number. For example, in the case of hypochlorous acid, the atom whose oxidation number changes when hypochlorous acid is reduced is chlorine, and the number of moles of chlorine is the same as that of hypochlorous acid. Since the change in the oxidation number of chlorine at the time of reduction from hypochlorous acid to chlorine ions changes from +1 to −1, so that the amount of change is 2. Therefore, the mol equivalent of hypochlorous acid is a value obtained by multiplying the number of moles of hypochlorous acid by 2.

The concentration of the oxidizing substance (oxidizing agent) in the oxidizing agent aqueous solution may be appropriately determined so that a total amount of the oxidizing substance (oxidizing agent) is within the above range depending on the amount of acidic ion exchange resin to be treated, the amount of oxidizing agent aqueous solution to be used, solubility of the oxidizing substance to be used, etc.

The method for bringing the oxidizing agent aqueous solution into contact with the acidic ion exchange resin is not particularly limited. For example, it is possible to adopt a method (batch method) of placing an acidic ion exchange resin and an oxidizing substance in the same container and mixing and stirring the mixture so as to obtain a uniform state or a method {column method (also referred to as the distribution method)} of flowing an oxidizing substance through a column filled with an acidic ion exchange resin.

In the oxidation treatment step, in order to obtain the desired effect, the acidic ion exchange resin and the oxidizing agent aqueous solution are brought into contact with each other until the oxidizing substance is reduced in an amount of 0.3 mol equivalent or more and 1.0 mol equivalent or less per liter of the acidic ion exchange resin. If the value is below the lower limit value, the effect of suppressing the decomposition of molecular hypochlorous acid in the ion exchange step becomes small. If the value exceeds the upper limit value, not only the time required for the treatment becomes long, but also the acidic ion exchange resin deteriorates, and the efficiency is rather lowered. From the viewpoint of effect, it is preferable that the contact be carried out so that a reduction amount (consumption amount) of the oxidizing substance per liter of the acidic ion exchange resin is 0.35 mol equivalent or more and 0.9 mol equivalent or less, particularly 0.4 mol equivalent or more and 0.8 mol equivalent or less. The reduction amount (consumption amount) of the oxidizing substance can be grasped by analyzing the concentration of the oxidizing substance in the oxidizing agent aqueous solution after the start. That is, for the acidic ion exchange resin and the oxidizing agent aqueous solution to be actually used, a relationship between the treatment time and the reduction amount (consumption amount) of the oxidizing substance in the actual contact conditions (for example, in the case of a batch treatment method, the amount of both, the contact time, the contact temperature, etc., in the case of a distribution treatment method, the amount of both, the space velocity, the contact temperature, etc.) may be investigated in advance, and the treatment may be performed in a time that reaches a predetermined consumption amount. The concentration of the oxidizing substance in the oxidizing agent aqueous solution may be measured by appropriately selecting from analysis methods such as liquid chromatography, gas chromatography, and ion chromatography according to the oxidizing substance, or may be measured using a measuring device specialized for a specific oxidizing substance, such as a hydrogen peroxide concentration meter or an effective chlorine concentration meter. When the oxidizing substance is molecular hypochlorous acid and/or chlorine dioxide, the consumption amount may be evaluated by the change in the effective chlorine concentration.

[Washing Step]

In the washing step, when a substance other than molecular hypochlorous acid is used as an oxidizing agent, the washing step is an optional process performed in order to avoid mixing of the oxidizing agent into a product. In this washing step, an acidic ion exchange resin after the oxidation treatment step is washed with ion-exchanged water and/or pure water (distilled water). Ion-exchanged water and/or pure water (distilled water) is used so as not to reduce the exchange capacity of the acidic ion exchange resin after the oxidation treatment step, and the ion conductivity of these waters used for washing is 3 (mS/m) or less. In particular, water having an ion conductivity of 2.5 (mS/m) or less is preferably used, and water having an ion conductivity of 2 (mS/m) or less is most preferably used.

The amount and frequency of washings are not particularly limited, and it is sufficient that an excess oxidizing substance remaining after the oxidation treatment step and a treatment product produced by reduction of the oxidizing substance are washed away. As a method for confirming whether the oxidizing substance and the treatment product have been washed away, a method for confirming that by analysis such as gas chromatography, liquid chromatography, or ion chromatography, a method for confirming that by measurement using a hydrogen peroxide concentration meter or an effective chlorine concentration meter, and other methods can be adopted. However, it is not necessary to perform confirmation by these analyzes and measurements every time. A preliminary experiment may be conducted in advance to confirm the conditions under which sufficient washing can be performed, and such conditions may be applied.

[(B) Separation Step]

The (B) separation step is a step of separating the acidic ion exchange resin from the mixed solution after the ion exchange step to obtain a weakly acidic hypochlorous acid aqueous solution.

As a method for separating the acidic ion exchange resin from the mixed solution, any method may be used as long as the two can be separated. For example, stirring may be stopped, the solution may be allowed to stand until the resin settles, and the supernatant may be scooped up by a container and collected, may be collected by decantation, or may be pumped up by a machine such as a pump and collected. It is also possible to collect the resin by filtering using a filter paper, a filter cloth, or the like without waiting for the settling of the resin after stirring. In order to accelerate the settling of the resin, it is also possible to settle and collect the resin using a centrifuge.

In the (A) ion exchange step, the pH of an acidic hypochlorous acid water obtained immediately after the treatment may not be 5.5 or less, which is the upper limit of the pH of the target aqueous solution. That is, since the acidic ion exchange resin exhibits a buffering action at a pH of around 5 to 6, the pH may exceed 5.5 and become 6.5 or less due to the buffering action depending on the amount of the ion exchange resin and the volume and concentration of the raw material solution. However, even in that case, the autolysis rate of the molecular type weakly acidic hypochlorous acid at a pH of 5.5 to 6.5 is high. Thus, the aqueous solution separated and collected during the (B) separation step or in the step is left, so that the pH becomes 5.5 or less due to the HCl produced by slight decomposition of the molecular hypochlorous acid. Once the pH is in a range of 5.5 or less and 3.0 or more, the pH stabilizes within the range. At this time, in order to shorten the standing time, the pH may be adjusted by adding HCl, nitric acid, phosphoric acid, or the like, which is an inorganic acid.

The weakly acidic hypochlorous acid water (target aqueous solution) obtained by the method of the present invention is useful as a disinfectant or sterilizer, and can be used for various disinfecting and sterilizing applications. A use mode thereof is not particularly limited. For example, a predetermined space may be disinfected or sterilized by spraying the target aqueous solution with a sprayer, tools, instruments, cloths or the like that are objects to be disinfected or sterilized are immersed in the target aqueous solution stored in a container such as a pallet and may be disinfected or sterilized, or walls, floors, desks, chairs and the like may be wiped with a cloth or the like soaked with the target aqueous solution. The weakly acidic hypochlorous acid aqueous solution (target aqueous solution) obtained by the method of the present invention contains molecular hypochlorous acid having high bactericidal activity and relatively high safety to the human body, and its concentration is stable. Therefore, the weakly acidic hypochlorous acid aqueous solution is suitable for simple sterilization of medical instruments and devices, and can also be used as a mouthwash for disinfection in the oral cavity.

The weakly acidic hypochlorous acid aqueous solution (target aqueous solution) obtained in the (B) separation step can be used as it is for these applications. However, considering the transportation cost, storage space, etc. when the target aqueous solution is used as a commercial product, it is preferable that when a user uses a thick stock solution consisting of the target aqueous solution having a high effective chlorine concentration, the user dilutes the thick stock solution with water, such as tap water, each time so that a preferable effective chlorine concentration is obtained depending on the use mode. As described above, in the method of the present invention, the yield is high when the effective chlorine concentration of the raw material aqueous solution is several thousand to several tens of thousands ppm. For example, since weakly acidic hypochlorous acid aqueous solution (target aqueous solution) having an effective chlorine concentration of about 10,000 (ppm) can be efficiently produced, the method is effective as a method for producing a thick stock solution when the thick stock solution is diluted and used as described above. However, if the effective chlorine concentration is too high, care must be taken in handling, and when considering the use by a general public who does not have specialized knowledge about chlorine-based sterilizers, the chlorine concentration in a concentrated stock solution is preferably 100 (ppm) or more and 1,000 (ppm) or less, and particularly preferably 300 (ppm) or more and 800 (ppm) or less.

In the method of the present invention, in order to efficiently produce a weakly acidic hypochlorous acid aqueous solution (target aqueous solution) that can be used as a thick stock solution having an effective chlorine concentration as described above, preferably, in the (A) ion exchange step, using a raw material aqueous solution having an effective chlorine concentration of 5,000 (ppm) or more and 30,000 (ppm) or less, an ionic hypochlorous acid is converted to molecular hypochlorous acid in high yield, and in the (B) separation step, after a first target aqueous solution having a high effective chlorine concentration [for example, if the yield is 80%, the effective chlorine concentration is 4,000 (ppm) to 24,000 (ppm)] is obtained, the first target aqueous solution is diluted with water having an ion conductivity of 3 (mS/m) or less to obtain a second target aqueous solution having an effective chlorine concentration of 100 (ppm) or more and 1,000 (ppm) or less, particularly 300 (ppm) or more and 800 (ppm) or less.

EXAMPLES

Hereinafter, the present invention is described by way of examples and comparative examples in order to specifically describe the present invention. However, the present invention is by no means limited by these examples and comparative examples.

In Examples and Comparative Examples, the following were used as the aqueous metal hypochlorite solution, the acidic ion exchange resin, and the oxidizing substance.

[Aqueous Metal Hypochlorite Solution]
Effective chlorine concentration 12.0 (mass %) NaClO aqueous solution (Neorax Super: Supplier Shimada Shoten Co., Ltd.)

[Weakly Acidic Ion Exchange Resin]
Amberlite IRC-76 (manufactured by Organo Corporation): Total ion exchange capacity 3.9 (eq/L), hereinafter abbreviated as "IRC76".
Diaion WK401 (manufactured by Mitsubishi Chemical Corporation): Total ion exchange capacity 4.4 (eq/L), hereinafter abbreviated as "WK401".
Duolite C433LF (manufactured by Sumika Chemtex Co., Ltd.): Total ion exchange capacity 4.2 (eq/L), abbreviated as "433LF".

[Oxidizing Substance]
Weakly acidic hypochlorous acid water with an effective chlorine concentration of 7500 (ppm) (metal cation concentration: 1719 ppm by mass, manufactured by Tokuyama Dental Corporation)
Hydrogen peroxide solution with a concentration of 30.0 to 35.5% (manufactured by Fuji Film Wako Pure Chemical Corporation).

Examples 1 to 20, Comparative Examples 1 to 4

(1) Method for Producing Weakly Acidic Hypochlorous Acid Aqueous Solution

The 12% NaClO aqueous solution was diluted with ion-exchanged water having an ion conductivity of 3 (mS/m) or less to adjust the effective chlorine concentration to the effective chlorine concentration shown in Table 1, and thus to prepare a raw material aqueous solution (raw material aqueous solution preparation step). Next, the acidic ion exchange resin was weighed out by the volume amount shown in Table 1, the raw material aqueous solution was added in the amount shown in Table 1, and stirring and mixing were performed so that the acidic ion exchange resin was uniformly dispersed for the mixing time and temperature shown in Table 1 by using a fluororesin stirring blade (ion exchange step). During stirring, the pH of the mixed solution was monitored. Once the pH dropped and reached 5.5, or once a pH change within 3 minutes became ±0.3 or less, stirring was stopped, and the stirring time was defined as the mixing time. After the stirring was completed, the mixture was allowed to stand until the resin settled, and an acidic hypochlorous acid aqueous solution, which was a supernatant, was collected in a polyethylene container through a #200 filter cloth by decantation to prevent that the resin would enter (separation step). The hypochlorous acid aqueous solution whose pH did not reach 5.5 was collected and then left at room temperature for 4 hours in order to stabilize the pH.

TABLE 1

| | | Raw material aqueous solution (NaClO aqueous solution) | | | Weakly acidic ion exchange resin | | | | | |
|---|---|---|---|---|---|---|---|---|---|---|
| | | Effective chlorine concentration (ppm) | Volume (ml) | Na amount*1 (mol) | Type | Ion exchange capacity (eq) | Volume (ml) | $E_{MI}/E_{IE}$ | Mixing time (min) | Mixing temperature (° C.) |
| Example | 1 | 10900 | 300 | 0.046 | IRC76 | 0.39 | 100 | 0.12 | 15 | 23 |
| | 2 | 11000 | 600 | 0.093 | | 0.39 | 100 | 0.24 | 25 | 23 |
| | 3 | 11000 | 900 | 0.140 | | 0.39 | 100 | 0.36 | 30 | 23 |
| | 4 | 11000 | 1200 | 0.186 | | 0.39 | 100 | 0.48 | 30 | 23 |
| | 5 | 11400 | 1200 | 0.193 | | 0.39 | 100 | 0.49 | 30 | 23 |
| | 6 | 10100 | 1450 | 0.207 | | 0.39 | 100 | 0.53 | 30 | 23 |
| | 7 | 12000 | 1250 | 0.212 | | 0.39 | 100 | 0.54 | 30 | 23 |
| | 8 | 11000 | 4400 | 0.683 | | 1.56 | 400 | 0.44 | 30 | 18 |
| | 9 | 11400 | 1200 | 0.193 | | 0.39 | 100 | 0.49 | 45 | 23 |
| | 10 | 11650 | 300 | 0.049 | | 0.32 | 100 | 0.15 | 60 | 23 |
| | 11 | 107 | 1000 | 0.002 | | 0.023 | 6 | 0.06 | 10 | 23 |
| | 12 | 5500 | 300 | 0.023 | | 0.059 | 15 | 0.40 | 30 | 23 |
| | 13 | 20250 | 300 | 0.086 | | 0.20 | 50 | 0.44 | 30 | 23 |
| | 14 | 40100 | 300 | 0.170 | | 0.39 | 100 | 0.44 | 25 | 23 |
| | 15 | 11000 | 1200 | 0.186 | WK401 | 0.44 | 100 | 0.42 | 30 | 23 |
| | 16 | 11000 | 1200 | 0.186 | 433LF | 0.42 | 100 | 0.44 | 30 | 23 |
| Comparative Example | 1 | 10768 | 1200 | 0.182 | IRC76 | 0.39 | 100 | 0.47 | 5 | 23 |
| | 2 | 11400 | 1200 | 0.193 | | 0.39 | 100 | 0.49 | 240 | 23 |
| | 3 | 60000 | 300 | 0.254 | | 0.39 | 100 | 0.65 | 30 | 23 |
| | 4 | 110 | 1000 | 0.002 | | 0.195 | 50 | 0.01 | 10 | 23 |

*1Na amount is calculated from effective chlorine concentration and volume of aqueous metallic salt solution of hypochlorous acid
Na amount = effective chlorine concentration × (volume/1000)/0.0709

(2) Evaluation Method
(2-1) Measurement of Effective Chlorine Concentration

A part of the weakly acidic hypochlorous acid aqueous solution produced in (1) was used as a sample solution. The sample solution was diluted with ion-exchanged water at the following dilution ratio according to the effective chlorine concentration of a raw material solution, and a sample for measurement was prepared. The effective chlorine concentration after dilution was measured using an effective chlorine concentration measurement kit AQ-202 (Sibata Scientific Technology Ltd.). The effective chlorine concentration of the sample solution was determined from the measurement results and the dilution ratio.

Effective chlorine concentration of raw material solution 301 to 900 ppm: Dilution ratio 3 times
Effective chlorine concentration of raw material solution 901 to 3000 ppm: Dilution ratio 10 times
Effective chlorine concentration of raw material solution 3001 to 15000 ppm: Dilution ratio 50 times
Effective chlorine concentration of raw material solution 15001 to 120000 ppm: Dilution ratio 500 times (2-2) pH Measurement Using a pH meter F-55 (HORIBA, Ltd.), a part of the weakly acidic hypochlorous acid aqueous solution produced in (1) was used as a sample solution, and the pH of the measurement sample solution was measured.

(2-3) Na Ion Concentration Measurement

A part of the weakly acidic hypochlorous acid aqueous solution produced in (1) was used as a sample solution. The measurement sample solution was diluted with ion-exchanged water at the following dilution ratio according to the sodium ion concentration of a raw material solution, and a sample for measurement was prepared. The Na ion concentration of the measurement sample was measured using a Na ion meter (HORIBA, Ltd.). The Na ion concentration of the sample solution was determined from the measurement results and the dilution ratio.

Na ion concentration of raw material solution 101 to 500 ppm: Dilution ratio 5 times Na ion concentration of raw material solution 501 to 5000 ppm: Dilution ratio 50 times Na ion concentration of raw material solution 5001 to 20000 ppm: Dilution ratio 200 times (3) Production of Weakly Acidic Hypochlorous Acid Water and Evaluation of Obtained Aqueous Solution (Examples 1 to 16 and Comparative Examples 1 to 4)

Weakly acidic hypochlorous acid water was produced under the conditions shown in Table 1. Table 2 shows the effective chlorine concentration, pH, Na ion concentration and $C_{MI}/C_{EC}$ value of the produced weakly acidic hypochlorous acid water.

TABLE 2

| | | Produced weakly acidic hypochlorous acid water | | | | | |
|---|---|---|---|---|---|---|---|
| | | Effective chlorine concentration upon collection (ppm) | Effective chlorine concentration 4 hours after collection (ppm) | Na ion concentration (ppm) | $C_{MI}/C_{EC}$ | pH Immediately after collection | pH 4 hours after collection |
| Example | 1 | 6550 | — | 1300 | 0.20 | 4.7 | — |
| | 2 | 8211 | — | 1416 | 0.17 | 5.3 | — |
| | 3 | 7801 | — | 1459 | 0.19 | 5.1 | — |
| | 4 | — | 7736 | 1719 | 0.22 | 6.1 | 4.4 |
| | 5 | — | 7736 | 1925 | 0.25 | 6.0 | 4.5 |
| | 6 | — | 7832 | 2110 | 0.27 | 6.5 | 5.2 |
| | 7 | — | 9474 | 1989 | 0.21 | 6.5 | 5.2 |
| | 8 | — | 8853 | 1693 | 0.19 | 6.4 | 5.5 |
| | 9 | — | 8130 | 2003 | 0.25 | 6.0 | 4.8 |
| | 10 | — | 6538 | 1832 | 0.28 | 5.8 | 4.8 |
| | 11 | 46 | — | 12 | 0.26 | 4.2 | — |
| | 12 | — | 4230 | 870 | 0.21 | 6.0 | 4.7 |
| | 13 | 14382 | — | 2783 | 0.19 | 5.5 | — |
| | 14 | 22511 | — | 6132 | 0.27 | 5.1 | — |
| | 15 | — | 7254 | 1218 | 0.17 | 6.0 | 4.8 |
| | 16 | — | 8327 | 1281 | 0.15 | 5.8 | 4.8 |
| Comparative Example | 1 | — | 6923 | 2764 | 0.40 | 7.3 | 5.0 |
| | 2 | — | 6341 | 2473 | 0.39 | 5.8 | 4.8 |
| | 3 | 23600 | — | 14400 | 0.61 | 5.2 | — |
| | 4 | 32 | — | 13 | 0.41 | 4.2 | — |

Examples 1 to 16 satisfied all the conditions of the (A) ion exchange step in the production method of the present invention. The pH was 3.0 or more and 5.5 or less, the ratio ($C_{MI}/C_{EC}$) of the total concentration ($C_{MI}$) of metal ions to the effective chlorine concentration ($C_{EC}$) was 0.35 or less, and a weakly acidic hypochlorous acid aqueous solution which was the target aqueous solution of the present invention was obtained.

On the other hand, in Comparative Example 1 in which the mixing time was as short as 5 minutes, adsorption of Na ions was insufficient, and the $C_{MI}/C_{EC}$ value was 0.35 or more.

In Comparative Example 2 in which the mixing time was as long as 240 minutes, decomposition of molecular hypochlorous acid (HClO) became remarkable, the effective chlorine concentration decreased, and the yield decreased. In addition, the Na ion concentration increased, and the $C_{MI}/C_{EC}$ value was 0.35 or more.

For reference, FIG. 1 shows a time course of the Na ion concentration during the ion exchange step in Comparative Example 2.

In Comparative Example 3 (0.62 exceeding the upper limit value 0.5) in which the $E_{MI}/E_{IE}$ value was outside the range of the present invention, the specific high active site could not be sufficiently deactivated in the initial stage after the start of treatment, and ionic and/or molecular hypochlorous acid were decomposed by the remaining specific high active sites. Therefore, not only the yield significantly decreased, but also a large amount of Na ions remained, so that the $C_{MI}/C_{EC}$ value was 0.35 or more.

In addition, in Comparative Example 4 (0.01 below the lower limit value 0.05) in which the $E_{MI}/E_{IE}$ value was outside the range of the present invention, ionic and/or molecular hypochlorous acid were rapidly decomposed before the specific high active site was deactivated in the initial stage after the start of treatment. Therefore, not only the yield significantly decreased, but also a large amount of Na ions remained, so that the $C_{MI}/C_{EC}$ value was 0.35 or more.

(4) Confirmation of Influence of Na Ion Concentration on Storage Stability of Weakly Acidic Hypochlorous Acid Water (Reference Examples 1 to 4, Reference Comparative Examples 1 to 3)

An evaluation sample was prepared by adding NaCl to a weakly acidic hypochlorous acid water having a pH of 3.7 and an effective chlorine concentration of 798 (ppm) so that the Na ion concentration was 130 (ppm) to 400 (ppm). A 180 (ml) prepared sample was placed in a 200 (ml) PET (polyethylene terephthalate) container and stored in an incubator at 50° C., and a time course of the effective chlorine concentration was measured. Table 3 shows the effective chlorine concentration, Na ion concentration, $C_{MI}/C_{EC}$ value, and pH of each sample. The results are shown in FIG. 2.

TABLE 3

| | | Effective chlorine concentration (ppm) | Na ion concentration (ppm) | pH | $C_{MI}/C_{EC}$ |
|---|---|---|---|---|---|
| Reference Example | 1 | 798 | 130 | 3.7 | 0.16 |
| | 2 | | 150 | | 0.19 |
| | 3 | | 200 | | 0.25 |
| | 4 | | 230 | | 0.29 |
| Reference Comparative Example | 1 | | 310 | | 0.39 |
| | 2 | | 330 | | 0.41 |
| | 3 | | 400 | | 0.50 |

Reference Example 1 ($C_{MI}/C_{EC}$=0.16), Reference Example 2 ($C_{MI}/C_{EC}$=0.19), Reference Example 3 ($C_{MI}/C_{EC}$=0.25) and Reference Example 4 ($C_{MI}/C_{EC}$=0.29) were prepared so that the $C_{MI}/C_{EC}$ value was in the same range as the weakly acidic hypochlorous acid water which was the target aqueous solution of the present invention. In these reference examples, when stored at a high temperature of 50° C. to accelerate decomposition, about 80% of effective chlorine remained even after 21 days. On the other hand, in Reference Comparative Example 1 ($C_{MI}/C_{EC}$=0.39), Reference Comparative Example 2 ($C_{MI}/C_{EC}$=0.41), and Reference Comparative Example 3 ($C_{MI}/C_{EC}$=0.50) in which the $C_{MI}/C_{EC}$ value exceeded 0.35, the percentage of remaining effective chlorine after 21 days was less than 60%, and a rate of decrease thereafter was faster than those of Reference Examples 1 to 4.

(5) Production and Storage Stability Test of Weakly Acidic Hypochlorous Acid Water (Second Target Aqueous Solution) that has Undergone Dilution Step (Examples 17 to 20)

Each weakly acidic hypochlorous acid water produced in Examples 2 to 5 was diluted with ion-exchanged water having an ion conductivity of 3 (mS/m) or less to adjust the effective salt concentration to about 750 (ppm) (dilution step). Table 4 shows the effective chlorine concentration, Na ion concentration, $C_{MI}/C_{EC}$ value, and pH of the obtained diluted weakly acidic hypochlorous acid water (target aqueous solution).

Next, 350 (ml) of each of the above target aqueous solutions was placed in a PET (polyethylene terephthalate) container having a volume of 380 (ml) to prepare a sample for storage stability test, and the sample was stored in an incubator at 50° C. The storage stability was examined by measuring the time course of the effective chlorine concentration. The results are shown in FIG. 3.

TABLE 4

| | | Effective Chlorine Concentration after dilution (ppm) | Na ion concentration after dilution (ppm) | pH after dilution | $C_{MI}/C_{EC}$ after dilution |
|---|---|---|---|---|---|
| Example | 17 | 761 | 120 | 5.3 | 0.16 |
| | 18 | 784 | 140 | 5.1 | 0.18 |
| | 19 | 778 | 170 | 4.5 | 0.22 |
| | 20 | 747 | 210 | 4.5 | 0.28 |

In Examples 17 to 20, the $C_{MI}/C_{EC}$ value was 0.35 or less, and the storage stability was similar to that in Reference Examples 1 to 4.

Examples 21 to 28

(6) Production of Weakly Acidic Hypochlorous Acid Aqueous Solution (6-1) Pretreatment/Oxidation Treatment Step of Acidic Ion Exchange Resin Weakly acidic hypochlorous acid water having an effective chlorine concentration of 7500 ppm and a hydrogen peroxide solution having a concentration of 30.0 to 35.5% were diluted with ion-exchanged water having an ion conductivity of 3 (mS/m) or less to prepare an oxidizing agent aqueous solution so that the effective chlorine concentration and the hydrogen peroxide concentration were the respective concentrations shown in Table 5.

TABLE 5

| | | Ion exchange resin | | | Pretreatment solution | | | Ratio of total valence equivalent to total ion exchange capacity |
|---|---|---|---|---|---|---|---|---|
| | | Type | Treatment amount (ml) | Total ion exchange equivalent (meq) | Type | Pretreatment amount (ml) | Concentration*[2] (ppm) | Total valence equivalent (meq) | |
| Example | 21 | IRC76 | 100 | 390 | HClO | 300 | 5830 | 17.4 | 1/22.4 |
| | 22 | IRC76 | 100 | 390 | HClO | 300 | 6090 | 18.2 | 1/21.4 |
| | 23 | IRC76 | 500 | 1950 | HClO | 1600 | 6045 | 96.4 | 1/20.2 |
| | 24 | IRC76 | 100 | 390 | HClO | 3000 | 1210 | 36.2 | 1/10.8 |

TABLE 5-continued

| | Ion exchange resin | | | Pretreatment solution | | | Ratio of total valence |
|---|---|---|---|---|---|---|---|
| | Type | Treatment amount (ml) | Total ion exchange equivalent (meq) | Type | Pretreatment amount (ml) | Concentration*2 (ppm) | Total valence equivalent (meq) | equivalent to total ion exchange capacity |
| 25 | IRC76 | 100 | 390 | HClO | 450 | 7123 | 31.9 | 1/12.2 |
| 26 | WK401 | 100 | 440 | HClO | 300 | 6210 | 18.6 | 1/23.7 |
| 27 | 433LF | 100 | 420 | HClO | 300 | 6302 | 18.8 | 1/22.3 |
| 28 | IRC76 | 100 | 390 | $H_2O_2$ | 300 | 5822 | 0.013 | 1/29900 |

*2 HClO concentrations before reaction and concentrations after reaction showed are effective chlorine concentrations Next, the acidic ion exchange resin was weighed out by the volume amount shown in Table 6, in each example, a pretreatment agent was added in the amount shown in Table 6, and stirring and mixing were performed so that the acidic ion exchange resin was uniformly dispersed by using a Teflon (trademark) fluororesin stirring blade until the concentration reached the concentration after the reaction shown in Table 6. After the stirring was completed, the mixture was allowed to stand until the resin settled, and the pretreatment agent, which was the supernatant liquid, was removed by decantation.

TABLE 6

| | | Ion exchange resin | | Pretreatment agent | | | | |
|---|---|---|---|---|---|---|---|---|
| | | Type | Treatment amount (ml) | Type | Pretreatment amount (ml) | Concentration Before reaction*3 (ppm) | Concentration After reaction*3 (ppm) | Reaction amount of oxidizing substance*4 (mol) | Reaction mol amount per 1 L of ion exchange resin (mol equivalent) |
| Example | 21 | IRC76 | 100 | HClO | 300 | 5830 | 733 | 0.02 | 0.43 |
| | 22 | IRC76 | 100 | HClO | 300 | 6090 | 427 | 0.02 | 0.48 |
| | 23 | IRC76 | 500 | HClO | 1600 | 6045 | 523 | 0.12 | 0.50 |
| | 24 | IRC76 | 100 | HClO | 3000 | 1210 | 394 | 0.03 | 0.69 |
| | 25 | IRC76 | 100 | HClO | 450 | 7123 | 193 | 0.04 | 0.88 |
| | 26 | WK401 | 100 | HClO | 300 | 6210 | 266 | 0.03 | 0.50 |
| | 27 | 433LF | 100 | HClO | 300 | 6302 | 232 | 0.03 | 0.51 |
| | 28 | IRC76 | 100 | $H_2O_2$ | 300 | 5822 | 422 | 0.05 | 0.95 |
| Reference Example | 5 | IRC76 | 200 | | | No pretreatment | | | |

*3 HClO concentrations before reaction and concentrations after reaction showed are effective chlorine concentrations
*4 HClO reaction amount (mol) is value obtained by dividing effective chlorine concentration by molecular weight of chlorine
HClO reaction amount (mol) = reaction amount (mg)/70.9

(6-2) Pretreatment/Washing Step

To the acidic ion exchange resin from which the oxidizing agent aqueous solution was removed, ion-exchanged water having an ion conductivity of 3 (mS/m) or less was added in the amount shown in Table 7, and the mixture was stirred for 10 seconds using a Teflon fluororesin stirring blade so that the acidic ion exchange resin was dispersed uniformly. After the stirring was completed, the mixture was allowed to stand until the resin settled, and a washing liquid, which was the supernatant liquid, was removed by decantation. The effective chlorine concentration and the hydrogen peroxide concentration were measured, and washing was repeated until the concentration became 15 ppm or less.

TABLE 7

| | | Washing amount | Residual concentration of pretreatment agent (ppm) |
|---|---|---|---|
| Example | 21 | 300 ml × 7 times | 15 |
| | 22 | 300 ml × 7 times | 8 |
| | 23 | 1500 ml × 7 times | 14 |
| | 24 | 300 ml × 7 times | 12 |
| | 25 | 300 ml × 7 times | 10 |
| | 26 | 300 ml × 7 times | 13 |
| | 27 | 300 ml × 7 times | 12 |
| | 28 | 300 ml × 7 times | 9 |
| Reference Example | 5 | No pretreatment | |

(6-3) Ion Exchange Step

The 12% NaClO aqueous solution was diluted with ion-exchanged water having an ion conductivity of 3 (mS/ m) or less to adjust the effective chlorine concentration to the effective chlorine concentration shown in Table 8 in each example, and thus to prepare a raw material aqueous solution. To the acidic ion exchange resin after the washing step, the raw material aqueous solution was added in the amount shown in Table 8 in each example, and stirring and mixing were performed so that the acidic ion exchange resin was uniformly dispersed for the mixing time and temperature shown in Table 8 by using a Teflon fluororesin stirring blade. During stirring, the pH of the mixed solution was monitored. Once the pH dropped and the pH change within 3 minutes became ±0.3 or less, stirring was stopped, and the stirring time was defined as the mixing time. After the stirring was completed, the mixture was allowed to stand until the resin settled, and an acidic hypochlorous acid aqueous solution, which was a supernatant, was collected in a polyethylene container through a #200 filter cloth by decantation to prevent that the resin would enter.

(7-2) pH Measurement

Using a pH meter F-55 (HORIBA, Ltd.), a part of the weakly acidic hypochlorous acid aqueous solution produced in (6) was used as a sample solution, and the pH of the measurement sample solution was measured.

(7-3) Na Ion Concentration Measurement

A part of the weakly acidic hypochlorous acid aqueous solution produced in (6) was used as a sample solution. The measurement sample solution was diluted with ion-exchanged water at the following dilution ratio according to the sodium ion concentration of a raw material solution, and a sample for measurement was prepared. The Na ion concentration of the measurement sample was measured using a Na ion meter (HORIBA, Ltd.). The Na ion concentration of the sample solution was determined from the measurement results and the dilution ratio.

Na ion concentration of raw material solution 101 to 500 ppm: Dilution ratio 5 times

TABLE 8

| | | Raw material aqueous solution (NaClO aqueous solution) | | | Weakly acidic ion exchange resin | | | | | |
|---|---|---|---|---|---|---|---|---|---|---|
| | | Effective chlorine concentration (ppm) | Volume/ (ml) | Na amount*5 (mol) ($E_{MI}$) | Type | Total ion exchange equivalent (eq) ($E_{IE}$) | Volume/ (ml) | $E_{MI}/E_{IE}$ | Reaction time (min) | Reaction temperature (° C.) |
| Example | 21 | 11000 | 1200 | 0.186 | IRC76 | 0.39 | 100 | 0.48 | 30 | 25 |
| | 22 | 11000 | 1200 | 0.186 | | 0.39 | 100 | 0.48 | 30 | 25 |
| | 23-1 | 11000 | 1200 | 0.186 | | 0.39 | 100 | 0.48 | 30 | 25 |
| | 23-2 | 113 | 1000 | 0.002 | | 0.02 | 6 | 0.07 | 10 | 25 |
| | 23-3 | 11000 | 600 | 0.093 | | 0.39 | 100 | 0.24 | 25 | 25 |
| | 23-4 | 20250 | 300 | 0.086 | | 0.20 | 50 | 0.44 | 30 | 23 |
| | 23-5 | 10100 | 1450 | 0.207 | | 0.39 | 100 | 0.53 | 30 | 23 |
| | 24 | 11000 | 1200 | 0.186 | | 0.39 | 100 | 0.48 | 30 | 25 |
| | 25 | 11000 | 1200 | 0.186 | | 0.39 | 100 | 0.48 | 30 | 25 |
| | 26 | 11000 | 1200 | 0.186 | WK401 | 0.39 | 100 | 0.48 | 30 | 25 |
| | 27 | 11000 | 1200 | 0.186 | 433LF | 0.39 | 100 | 0.48 | 30 | 25 |
| | 28 | 11000 | 1200 | 0.186 | | 0.39 | 100 | 0.48 | 30 | 25 |
| Reference Example | 5 | 11000 | 1200 | 0.186 | IRC76 | 0.39 | 100 | 0.48 | 30 | 25 |

*5Na amount is calculated from effective chlorine concentration and volume of aqueous metallic salt solution of hypochlorous acid
Na amount = effective chlorine concentration × (volume/1000)/70.9/1000

(7) Evaluation Method (7-1) Measurement of Effective Chlorine Concentration

A part of the weakly acidic hypochlorous acid aqueous solution produced in (6) was used as a sample solution. The sample solution was diluted with ion-exchanged water at the following dilution ratio according to the effective chlorine concentration of a raw material solution, and a sample for measurement was prepared. The effective chlorine concentration after dilution was measured using an effective chlorine concentration measurement kit AQ-202 (Sibata Scientific Technology Ltd.). The effective chlorine concentration of the sample solution was determined from the measurement results and the dilution ratio.

Effective chlorine concentration of raw material solution 301 to 900 ppm: Dilution ratio 3 times Effective chlorine concentration of raw material solution 901 to 3000 ppm: Dilution ratio 10 times Effective chlorine concentration of raw material solution 3001 to 15000 ppm: Dilution ratio 50 times Effective chlorine concentration of raw material solution 15001 to 120000 ppm: Dilution ratio 500 times Na ion concentration of raw material solution 501 to 5000 ppm: Dilution ratio 50 times Na ion concentration of raw material solution 5001 to 20000 ppm: Dilution ratio 200 times (8) Evaluation of Obtained Weakly Acidic Hypochlorous Acid Water Weakly acidic hypochlorous acid water was produced under the conditions shown in Tables 5 to 8. Table 9 shows the effective chlorine concentration, pH, Na ion concentration, $C_{MI}/C_{EC}$ value, and the percentage of remaining effective chlorine of the produced weakly acidic hypochlorous acid water. Here, the percentage of remaining effective chlorine is a value (%) obtained by dividing the effective chlorine concentration of the produced weakly acidic hypochlorous acid water by the effective chlorine concentration of the raw material aqueous solution, and means that the closer the value is to 100%, the less effective chlorine is reduced during production.

TABLE 9

Produced weakly acidic hypochlorous acid water

| | | Effective chlorine concentration (ppm) ($C_{MI}$) | Na ion concentration (ppm) ($C_{EC}$) | $C_{MI}/C_{EC}$ | pH Immediately after collection | pH 4 hours after collection | Percentage of remaining effective chlorine concentration (%) |
|---|---|---|---|---|---|---|---|
| Example | 21 | 9100 | 1923 | 0.21 | 6.3 | 5.0 | 83 |
| | 22 | 9500 | 1795 | 0.19 | 6.4 | 4.8 | 86 |
| | 23-1 | 9800 | 1820 | 0.19 | 6.5 | 4.8 | 89 |
| | 23-2 | 96 | 15 | 0.16 | 6.5 | 5.5 | 85 |
| | 23-3 | 9300 | 1798 | 0.19 | 6.5 | 4.8 | 85 |
| | 23-4 | 18300 | 2810 | 0.15 | 6.5 | 5.2 | 90 |
| | 23-5 | 8600 | 1932 | 0.22 | 6.5 | 4.8 | 85 |
| | 24 | 9950 | 1825 | 0.18 | 6.5 | 5.0 | 90 |
| | 25 | 9900 | 1893 | 0.19 | 6.5 | 5.3 | 90 |
| | 26 | 9753 | 1759 | 0.18 | 6.5 | 5.4 | 89 |
| | 27 | 9698 | 1849 | 0.19 | 6.5 | 5.3 | 88 |
| | 28 | 9352 | 1812 | 0.19 | 6.5 | 5.2 | 85 |
| Reference Example | 5 | 7800 | 1801 | 0.23 | 6.0 | 4.7 | 71 |

Reference Example 5

Using the acidic ion exchange resin shown in Table 6, the ion exchange step was performed by the batch method under the conditions shown in Table 8 without performing the pretreatment step to produce a weakly acidic hypochlorous acid aqueous solution, and the same evaluation as that of Examples was performed. The results are shown in Table 9.

Examples 21 to 28 satisfied all the conditions in the production method of the present invention, and the percentage of remaining effective chlorine concentration was 83% or more. On the other hand, in Reference Example 5, the percentage of remaining effective chlorine concentration was 71%, although the acidic ion exchange resin was not pretreated.

The invention claimed is:

1. A method for producing a weakly acidic hypochlorous acid aqueous solution, the method comprising:
(A) an ion exchange step of mixing a raw material aqueous solution containing an aqueous solution of metal salt of hypochlorous acid with a weakly acidic ion exchange resin and performing ion exchange between a metal ion and a hydrogen ion to produce molecular hypochlorous acid dissolved in a mixed solution; and
(B) a separation step of separating the weakly acidic ion exchange resin from the mixed solution after the ion exchange step to obtain a weakly acidic hypochlorous acid aqueous solution in which the molecular hypochlorous acid is dissolved,
wherein
the weakly acidic hypochlorous acid aqueous solution has a pH of 3.0 or more and 5.5 or less and a ratio ($C_{MI}/C_{EC}$) of a total concentration ($C_{MI}$) of a metal ion to an effective chlorine concentration ($C_{EC}$) is 0.35 or less, the total concentration ($C_{MI}$) of a metal ion is a total mass concentration of an amount of metal ions derived from an aqueous solution of a metal salt of hypochlorous acid as a raw material, and the effective chlorine concentration ($C_{EC}$) is a total chlorine equivalent mass concentration of an amount of chlorine molecules dissolved in an aqueous solution, a chlorine compound having oxidizing power, and a chlorine atom-containing ion having oxidizing power,
the effective chlorine concentration of the raw material aqueous solution is 500 ppm to 50,000 ppm,
a surface of the weakly acidic ion exchange resin includes an active site having an activity against decomposition of ionic and/or molecular hypochlorous acid,
a quantity ratio of the raw material aqueous solution and the weakly acidic ion exchange resin mixed in the (A) ion exchange step is a quantity ratio at which a ratio ($E_{MI}/E_{IE}$) of a total ion exchange equivalent ($E_{IE}$) of the weakly acidic ion exchange resin and a total chemical equivalent ($E_{MI}$) of the metal ion in the raw material aqueous solution is 0.05 or more and 0.5 or less, the total ion exchange equivalent ($E_{IE}$) of the weakly acidic ion exchange resin is an ion exchange capacity when all the exchange groups of the ion exchange resin act, and the total chemical equivalent ($E_{MI}$) of the metal ion in the raw material aqueous solution is a sum of the valences of metal ions contained in the aqueous solution of the metal salt of hypochlorous acid, that is the raw material,
a solution temperature during mixing is 5° C. or more and 40° C. or less, and
a mixing time is 10 minutes or more and 120 minutes or less.

2. The method of claim 1, wherein the effective chlorine concentration of the raw material aqueous solution is 5,000 (ppm) or more and 30,000 (ppm) or less.

3. The method of claim 2, further comprising a raw material aqueous solution preparation step of diluting an aqueous metal hypochlorite solution having an effective chlorine concentration of 50,000 (ppm) or more with water having an ion conductivity of 3 (mS/m) or less to obtain a raw material aqueous solution having an effective chlorine concentration of 5,000 (ppm) or more and 30,000 (ppm) or less.

4. The method of claim 1, further comprising a dilution step of diluting the weakly acidic hypochlorous acid aqueous solution obtained in the (B) separation step with water having an ion conductivity of 3 (mS/m) or less to obtain an effective chlorine concentration of 100 (ppm) or more and 1,000 (ppm) or less.

5. The method of claim 1, further comprising, prior to the (A) ion exchange step, a pretreatment step including an oxidation treatment step of bringing the weakly acidic ion exchange resin and an oxidizing agent aqueous solution into contact with each other, the contact being performed until the oxidizing substance having an amount of 0.3 mol equivalent or more and 1.0 mol equivalent or less per liter of the weakly acidic ion exchange resin is reduced.

6. The method of claim 5, wherein the oxidizing substance is at least one compound selected from the group consisting of molecular hypochlorous acid, chlorine dioxide, hydrogen peroxide, ozone, and organic peroxide.

7. The method of claim 5, wherein the pretreatment step further includes, after the oxidation treatment step, a washing step of washing the weakly acidic ion exchange resin, which has been oxidized, with ion-exchanged water or pure water.

* * * * *